United States Patent [19]
Robson

[11] Patent Number: 5,867,612
[45] Date of Patent: Feb. 2, 1999

[54] METHOD AND APPARATUS FOR THE FAST SCALING OF AN IMAGE

[75] Inventor: Thomas Robson, Penfield, N.Y.

[73] Assignee: Xerox Corporation, Stamford, Conn.

[21] Appl. No.: 622,781

[22] Filed: Mar. 27, 1996

[51] Int. Cl.$^6$ .............................. G06K 9/32; G06K 9/34; G06K 9/36; G06K 9/46
[52] U.S. Cl. ..................... 382/298; 382/137; 382/177; 382/235; 382/245; 382/293; 382/297; 382/298; 382/302; 358/426
[58] Field of Search ................................ 382/137, 177, 382/235, 293, 297, 245, 298, 302; 358/426

[56] References Cited

U.S. PATENT DOCUMENTS

| | | | |
|---|---|---|---|
| 3,812,336 | 5/1974 | Bossen et al. ............................ | 371/2.2 |
| 4,168,488 | 9/1979 | Evans ...................................... | 382/297 |
| 4,445,137 | 4/1984 | Panofsky ................................. | 382/302 |
| 4,590,606 | 5/1986 | Rohrer .................................... | 382/137 |
| 5,111,514 | 5/1992 | Ohta ........................................ | 382/177 |
| 5,113,494 | 5/1992 | Menendez et al. ..................... | 395/502 |
| 5,239,625 | 8/1993 | Bogart et al. ........................... | 395/128 |
| 5,245,441 | 9/1993 | Ruben .................................... | 358/426 |
| 5,245,676 | 9/1993 | Spitz ....................................... | 382/235 |
| 5,303,334 | 4/1994 | Snyder et al. .......................... | 395/109 |
| 5,452,374 | 9/1995 | Cullen et al. ........................... | 382/293 |
| 5,504,591 | 4/1996 | Dujari ..................................... | 358/426 |
| 5,581,635 | 12/1996 | Zhu et al. ............................... | 382/245 |

OTHER PUBLICATIONS

*Xerox Disclosure Journal*; "Image Scaling Using Bit Throw–Away Memory", vol. 5 No. 6, Nov./Dec. 1980, p. 639.

*Xerox Disclosure Journal*; "Fast Small–Angle Bitmap Rotation", vol. 17 No. 5 Sep./Oct. 1992 pp. 391–392.

*Encyclopedia of Graphics File Formats*; "Data Compression"; Chapter 9; James D. Murray and William Van Ryper; pp. 125–143.

*IBM Technical Disclosure Bulletin*; "Rotating Image Data"; vol. 21 No. 4, Sep. 1978; pp. 1424–1426; D. G. Abraham.

*IBM Technical Disclosure Bulletin*; "Rotation of Images Using Contour Compressed Data", vol. 18 No. 8, Jan. 1976; pp. 2640–2642; T. H. Morrin.

*Primary Examiner*—Andrew W. Johns
*Assistant Examiner*—Daniel G. Mariam
*Attorney, Agent, or Firm*—Duane C. Basch

[57] ABSTRACT

The present invention is a method and apparatus for the efficient processing of binary images represented as a run length encoded data stream. The system employs a CPU and cache or other memory for efficiently scaling or scaling and rotating parsed RLE date. Subsequently, the scaled RLE data can be decoded to produce a scaled image bitmap.

4 Claims, 6 Drawing Sheets

METHOD AND APPARATUS FOR THE FAST SCALING OF AN IMAGE

COPYRIGHT NOTIFICATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

This invention relates generally to an image processing system, and more particularly to a method and apparatus for the fast processing of binary images employing a run length encoded representation thereof.

CROSS REEERENCE

The following related applications are hereby incorporated by reference for their teachings:

"METHOD AND APPARATUS FOR THE FAST ROTATION OF AN IMAGE," Thomas Robson, application Ser. No. 08/624,044, filed concurrently herewith (Atty. Dkt. No. D/96118); and "METHOD FOR CONVERTING CCITT COMPRESSED DATA," Thomas Robson, application Ser. No. 08/161,492, filed Dec. 6, 1993 now U.S. Pat. No. 5,509,088.

BACKGROUND SUMMARY OF THE INVENTION

The present invention is directed to image processing and in particular to image scaling. As will be appreciated, scaling of an image is a fundamental element of an image processing system, be it a dedicated image processing system or one that is part of a digital printer, facsimile machine, or multifunctional device. The present invention is directed to a high speed method and apparatus for accomplishing one or two dimensional scaling of digitized images that are represented in a run length encoded manner.

Heretofore, a number of patents and publications have disclosed methods for image scaling, the relevant portions of which may be briefly summarized as follows:

R. Tuhro described in the *Xerox Disclosure Journal*, Vol. 5, No. 6, November/December 1980 (p. 639) *Image Scaling Using Bit Throw-away Memory*. In the disclosure, a logic circuit for accomplishing the scaling at a high data rate is taught.

U.S. Pat. No. 5,303,334 to Snyder et al., issued Apr. 12, 1994, teaches a system for rendering a graphic image. In particular, the system employs opcodes, wherein the opcodes are described as representing instructions to scale a source image and rotate a source image.

U.S. Pat. No. 5,245,441 to Ruben, issued Sep. 14, 1993, and incorporated by reference for its teachings related to CCITT compression, discloses an image processing method and apparatus, where an image stream is represented logically as a series of run length codes. During a decompression operation, CCITT encoded data is received, decoded into a full raster image, and clipping, windowing and scaling operations are then applied. At col. 8, lines 43–54, Ruben teaches the use of codes representing pixels of the same color and the performance of mathematical operations on such codes without converting them back into run lengths.

U.S. Pat. No. 5,113,494 to Menendez et al., issued May 12, 1992, appears to disclose a pipelined raster image processor. In the preferred embodiment, Menendez et al. describes a raster image processor (RIP) capable of performing several different image processing operations. The RIP contains a scaler, which receives output from a decompressor, for scaling the decompressed image from one resolution to another. The scaler is connected to a bus by which the image data is transferred on a block-by-block basis.

U.S. Pat. No. 5,239,625 to Bogart et al., issued Aug. 24, 1993, teaches the merging of images, particularly images represented in compressed format using run length encoding techniques. To accomplish scaling, the low resolution rasterization is multiplied by repeat pixel counts reflected in the run length data for a single raster line and identical lines are represented with repeat line counts.

In accordance with the present invention, there is provided a method, operating on a programmable data processing system, for scaling an image represented as a run length encoded data stream to produce a scaled run length encoded data stream representing a scaled version of the image, comprising the steps of: parsing the run length encoded data stream to determine the lengths of continuous runs of a color; multiplying each of the lengths by a scaling factor to produce a stream of scaled run lengths; applying at least one scaling rule to the stream of scaled run lengths to alter a run length therein; and outputting the scaled run lengths as a scaled run length encoded data stream.

In accordance with another aspect of the present invention, there is provided a method, operating on a programmable data processing system, for processing an image represented as a run length encoded data stream to produce a second run length encoded data stream representing a processed version of the image, comprising the steps of: parsing the run length encoded data stream to determine the lengths of continuous runs of a color; multiplying each of the lengths by a scaling factor to produce a stream of scaled run lengths; applying at least one scaling rule to the stream of scaled run lengths to alter a run length therein; and rotating the scaled run length encoded data stream while decoding the run length encoded data stream to produce a binary array of image signals, said binary array of image signals representing the image at a different resolution and orientation.

In accordance with yet another aspect of the present invention, there is provided an apparatus for scaling a run length encoded data stream, comprising: an input buffer for storing at least a portion of the run length encoded data stream; means for parsing the run length encoded data stream to determine the lengths of continuous runs of a color; arithmetic circuitry for multiplying each of the lengths by a scaling factor to produce a stream of scaled run lengths; and memory for storing the scaled run lengths as a scaled run length encoded data stream.

One aspect of the present invention deals with a basic problem in image processing, the fast scaling of image bitmaps. Resolution of this problem finds practical application in various image output devices where an image generated at a first resolution is constrained to be printed at a second resolution. For example, an image may be generated or scanned in at 300 dots per inch (dpi) but printed using an a print engine capable of rending marks on a substrate at 600 dpi. Alternatively, one may wish to print an image in a magnified or reduced fashion.

This aspect is further based on the discovery of a technique that alleviates this problem of different resolutions. The technique employs the compressed form of an image, when it has been represented as a run length encoded bit stream, to accomplish the scaling or resolution conversion in a computationally efficient manner. In particular, the preferred embodiment of the invention relies upon a fast scaling technique operating on run length encoded data to facilitate the rapid scaling during decoding of the run length data.

This technique can be implemented, for example, by any image processing system, be it hardware or software based. Machines implementing the invention may include printers, scanners, facsimile machines as well as multifunction machines. The hardware required preferably includes a microprocessor or similar control circuitry to control memory access (e.g., read/write) and to perform simple arithmetic operations on the stored data.

The technique described above is advantageous because it is not only simple but efficient. Furthermore, it can be adapted to any image processing system in which run length encoded data is generated or employed, making it available for use in any of a number of digital image processing systems, particularly those using run length encoding for data compression. The techniques of the invention are advantageous because they permit the highly efficient scaling of image bitmaps. The present invention is one of a plurality of image processing operations that can be applied to compressed image formats to enable faster processing of image data in an image processing system. Some of the related techniques can be used to perform image processing while decoding a run length encoded image. Other techniques include the scaling of an image while decoding.

Figure 1:
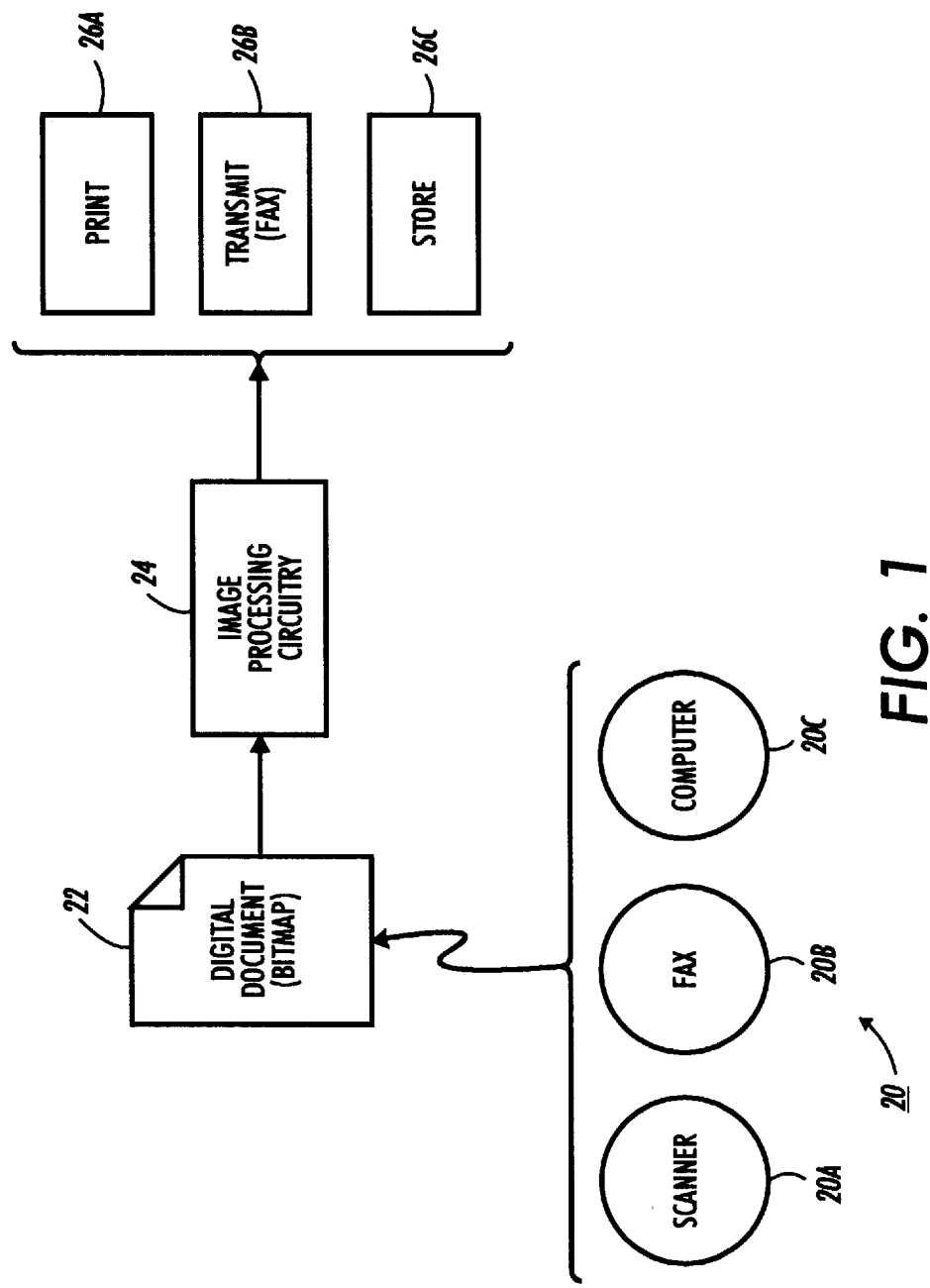
FIG. 1 is a general block diagram illustrating a possible embodiment of the present invention.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings and the Software Code Appendix included herein. In the drawings, like reference numerals have been used throughout to designate identical elements. In describing the present invention, the following term(s) have been used in the description.

The term "data" refers herein to physical signals that indicate or include information. When an item of data can indicate one of a number of possible alternatives, the item of data has one of a number of "values." For example, a binary item of data, also referred to as a "bit," has one of two values, interchangeably referred to as "1" and "0" or "ON" and "OFF" or "high" and "low." As used herein, a binary value of one is employed to represent a colored mark (e.g., black) found in an image. A bit is an "inverse" of another bit if the two bits have different values. An N-bit item of data has one of $2^N$ values.

A "multi-bit" item of data is an item of data that includes more than one bit. For example, a "word" is a multi-bit item of data that can be accessed or otherwise operated on as a unit. For the purposes of the present description, a word is represented herein as a 32-bit item of data although advanced computer platforms may include larger (e.g., 64-bit) addressable words.

The term "data" includes data existing in any physical form, and includes data that are transitory or are being stored or transmitted. For example, data could exist as electromagnetic or other transmitted signals or as signals stored in electronic, magnetic, or other form.

"Circuitry" or a "circuit" is any physical arrangement of matter that can respond to a first signal at one location or time by providing a second signal at another location or time. Circuitry "stores" a first signal when it receives the first signal at one time and, in response, provides substantially the same signal at another time. Circuitry "transfers" a first signal when it receives the first signal at a first location and, in response, provides substantially the same signal at a second location. "Image processing circuitry" is circuitry designed and intended primarily for carrying out operations on data that is representative of an image (e.g., image signals or pixels).

A "data storage medium" or "storage medium" is a physical medium that can store data. Examples of data storage media include magnetic media such as diskettes, floppy disks, and tape; optical media such as laser disks and CD-ROMs; and semiconductor media such as semiconductor ROMs and RAMs. As used herein, "storage medium" covers one or more distinct units of a medium that together store a body of data. For example, a set of floppy disks storing a single body of data would together be a storage medium.

"Memory circuitry" or "memory" is any circuitry that can store data, and may include local and remote memory and input/output devices. Examples include semiconductor ROMs, RAMs, and storage medium access devices with data storage media that they can access. A "memory cell" is memory circuitry that can store a single unit of data, such as a bit or other n-ary digit or an analog value.

A "data processing system" is a physical system that processes data. A "data processor" or "processor" is any component or system that can process data, and may include one or more central processing units or other processing components.

The terms "coprocessor" and "host processor" are complementary terms. A "host processor" is capable of operating independently but it can also be connected to a "coprocessor" so that the host processor and the coprocessor operate in an interdependent manner.

A processor "accesses" an item of data in memory by any operation that retrieves or modifies the item, such as by reading or writing a location in memory that includes the item. A processor can be "connected for accessing" an item of data by any combination of connections with local or remote memory or input/output devices that permits the processor to access the item.

A processor or other component of circuitry "operates on" an item of data by performing an operation that includes obtaining a resulting item of data that depends on the item of data operated on. For example, the resulting item of data could result from an operation that accesses the item of data operated on or from a logic or arithmetic operation on the item of data operated on.

A "logic operation" is an operation that obtains one bit using each bit of an operand independent of values of other bits of the operand. NOT is an example of a logic operation that uses one operand. OR, AND, and XOR are examples that use two or more operands.

An "address" is an item of data that can be used to address a memory cell within memory circuitry that includes plural memory cells.

An "instruction" is an item of data that a processor can use to determine its own operation. A processor "executes" a set of instructions when it uses the instructions to determine its operations.

To "obtain" or "produce" an item of data is to perform any combination of operations that begins without the item of data and that results in the item of data.

An operation "encodes" items of data when performing the operation on the items of data produces different items of data from which the encoded data items can subsequently be recovered. The operation that recovers the encoded data items is "decoding."

"Code" means data indicating instructions, but in a form that a processor can execute.

A "sequence" or "subsequence" of items of data is a set of items that a processor can access in sequence; in other words, once the first item in a sequence or subsequence has been accessed, each subsequent item can be accessed after accessing previous items in the sequence or subsequence. For example, contiguous memory locations may be accessed in sequence by incrementing an item of data representing a memory address.

An "array of data" or "data array" or "array" is a combination of items of data that can be mapped into an array. A "bitmap" or "two-dimensional image array" is a data array whose items of data can be mapped into an array having two dimensions, each item of data representing an image signal.

A "pixel" is the smallest segment into which an image is divided in a given system. In an array defining an image in which each item of data provides a value, each value indicating the color of a location may be called a "pixel value". Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image.

An operation performs "image processing" when it operates on an item of data that relates to part of an image.

The terms "scaling" and "resolution conversion" are used herein to describe an image processing operation that produces a change in the number pixel values employed to represent a single pixel in an input image. For example, when an image is scaled two-dimensionally by a factor of 2× each input pixel will be represented by a total of four scaled pixels (2× scaling in both directions). Similarly, for a scaling factor of 0.5×, a single output pixel will be employed to represent four input pixels. Furthermore, although the above examples describe two-dimensional scaling operations, there is no intent to limit the present to two-dimensional scaling as it may be advantageous to perform scaling in only a single dimension. As will be appreciated, a scaling operation may be necessary to render an image of the same physical dimensions when the image is to be printed at a resolution different than the input image resolution. For example, a 300 dpi image will need to be scaled by a factor of 2× in order for it to have the same approximate size when printed on a printer using an output resolution of 600 dpi.

An "image input terminal" (IIT) or "image input device" is a device that can receive an image and provide an item of data defining a version of the image. A "scanner" is an image input device that receives an image by a scanning operation, such as by scanning a hard copy document.

An "image output device" (IOT) is a device that can receive an item of data defining an image and provide the image as output. A "display" is an image output device that provides the output image in human viewable form. The visible pattern presented by a display is a "displayed image" or simply "image."

Turning now to FIG. 1, displayed therein is a general image processing system as would be suitable for an embodiment of the present invention. In particular, FIG. 1 illustrates a plurality of image input terminals (IITs) represented by scanner 20a, facsimile device 20b or computer 20c. It will be appreciated by those skilled in the art that numerous IITs may be employed as the source of a digital document 22. Digital document 22 is preferably a bitmap array of image data. In the embodiment depicted, the image data forming the digital document is processed by image processing circuitry 24 in order to produce output data (not shown) capable of driving or controlling the rendition of an image on one of the plurality of well-known image output terminals (IOTs) represented with reference numerals 26a, 26b and 26c. It will be further appreciated that image processing circuitry 24 may be dedicated circuitry including memory and logic elements suitable for accomplishing a desired operation on image data, or it may embody a commercially available data processing system having memory, logic and control elements therein programmed in a manner to accomplish the desired operations.

Figure 2:
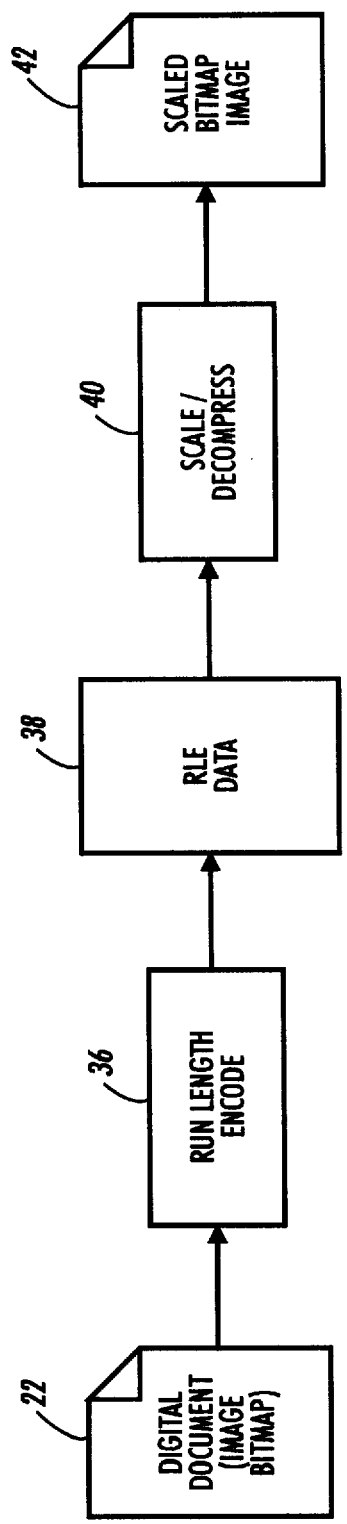
FIG. 2 is a data flow diagram representing the inputs and outputs of the essential components of the present invention.

Building on the embodiment of FIG. 1, FIG. 2 illustrates in more detail the data flow of an aspect of the present invention. Bitmap data from digital document 22 is passed through a run length encoder 36 to produce the run length encoded data stream represented by data object 38. It will be appreciated that the present invention operates on run length encoded information and that there are a number of methods and techniques for obtaining such information. The process of run length encoding (RLE) is well-known as demonstrated by RLE employed in CCITT Group 3 and Group 4 compression, by Huffman-type encoding and by other equivalent RLE file formats as described, for example, by J. D. Murray and W. vanRyper in *Encyclopedia of Graphic File Formats*, July 1994, O'Reilly & Assoc. the relevant portions of which are hereby incorporated by reference for their teachings concerning run length encoding. Having the RLE data 38, the present invention operates to both scale and decompress in a computationally efficient manner, as depicted by operation 40, to produce a scaled bitmap image represented by data object 42 in FIG. 2.

Figure 3:
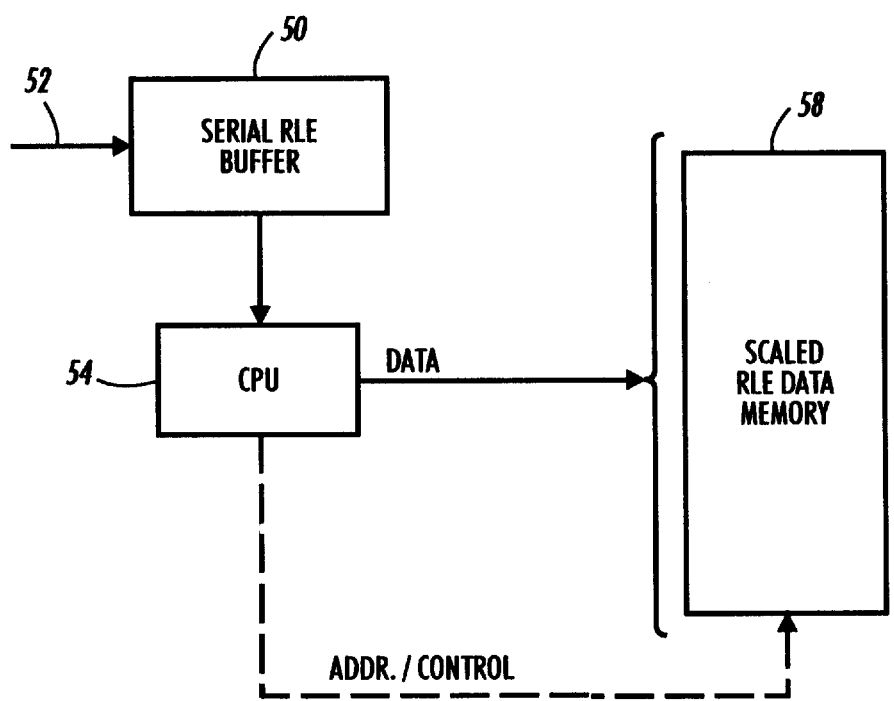
FIG. 3 is a detailed block diagram illustrating the various components within a computer system capable of implementing the present invention.

Having generally described an image processing embodiment and the operation of the present invention, attention is now turned to FIG. 3, where a preferred hardware embodiment for the present invention is illustrated. As shown therein, RLE data 38 of FIG. 2 is received into serial RLE buffer 50 via line 52. The RLE data is then supplied to a processor, represented as CPU 54, where it is parsed and processed as will be described hereafter, to produce scaled run length encoded data, the scaled data then being processed to produce binary signals that may be composed and transferred in a word-wise fashion to sealed RLE data memory 58.

As will be appreciated by those skilled in the design of digital data processing systems, the performance of the system depicted in FIG. 3 may depend upon the characteristics of the CPU and page buffer memories and any bus or logic circuitry employed to transfer or process data present within the system. In a preferred embodiment, the image processing system employing CPU 54 is a Intel Pentium®, Pentium Pro based workstation or a Sun SPARC-station. Similarly, memory 58 is preferably comprised of SRAM or similar memory circuitry capable of read/write access with minimal access times under the control of CPU 54 or a direct memory access component.

Figure 4:
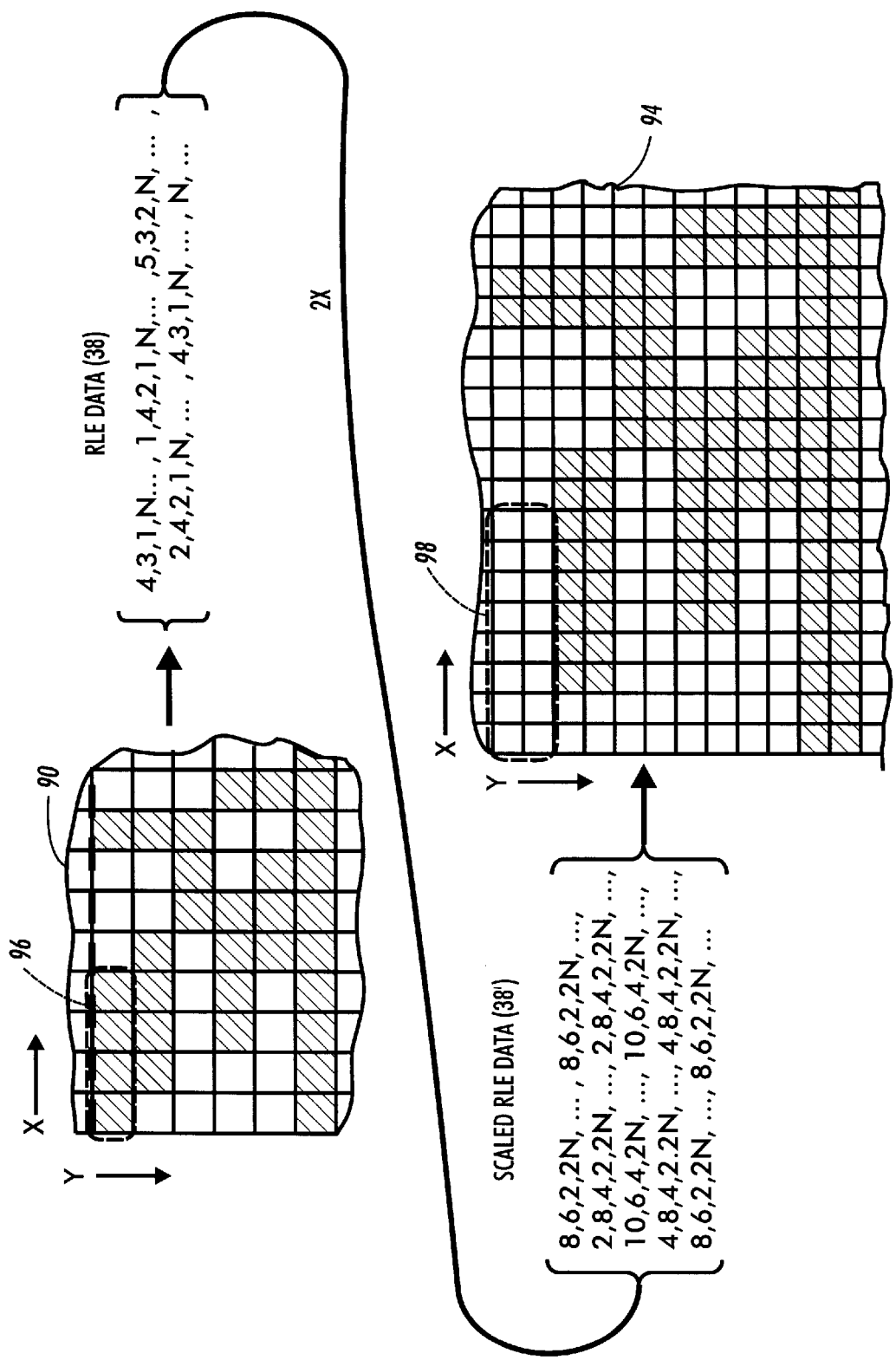
FIG. 4 is an illustrative example of the manner in which the run length encoded information is processed to accomplish image scaling in accordance with the present invention.

Referring next to FIG. 4, in conjunction with FIG. 3, in which there is illustrated an example of the operation of the present invention to produce a 2x resolution converted or scaled image bitmap 94. In a preferred embodiment, the hardware components of FIG. 3 are controlled by a set of preprogrammed instructions. The instructions are generated as a result of the compilation of the software source code found in the Software Appendix. In operation, CPU 54 operates to execute the preprogrammed instructions so as to process the run length encoded data as illustrated in FIG. 4. For example, beginning with a portion of a binary bitmap, as seen in image segment 90 of FIG. 4 where shaded regions represent black pixels, a stream of RLE data 38 is produced and provided to the system of FIG. 3. As described above, the CPU receives the RLE data from the buffer and parses the data to identify the sizes of the alternating black and white run lengths. To produce a scaled bitmap image, the run lengths for each scanline are appropriately scaled (e.g., a black run of four pixels 96 would produce two lines of eight contiguous black pixels indicated as 98). Although the example depicts a simplified scaling operation of 2x, it will be appreciated that the present invention can accommodate non-integer scaling factors through the use of truncation and rounding along with the application of simple tests to preserve image content as are found in detail in the Software Appendix.

As FIG. 4 illustrates in detail, the parsed RLE data is then employed to place the appropriate binary pixel value (e.g., black=1; white =0) in each bit location in the page buffer memory. In more detail, each line of input RLE data is first parsed and then scaled in one-dimension to produce a plurality of binary bits (e.g., a 32-bit word), in response to the scaled RLE data stream 38'. Scaled RLE data stream 38' may be produced using arithmetic logic (e.g., shifting for scaling by factors of two)), a multiplication operation, or via look-up table translation (preprogrammed according to the scale factor) and then decoded to produce a bit stream that can be stored as the scaled image bitmap 94 in the scaled RLE data memory 58. As will be appreciated alternative, conventional run length decoding techniques and devices can be employed to parse the scaled RLE data stream. Alternatively, the present invention may be employed in conjunction with the rotation of the scaled RLE data as will be described with respect to FIG. 6, and as has been described and previously incorporated herein by reference to the co-pending application Ser. No. 08/624,044 (Atty. Dkt. No. D/96118) filed concurrently herewith.

Figure 5:
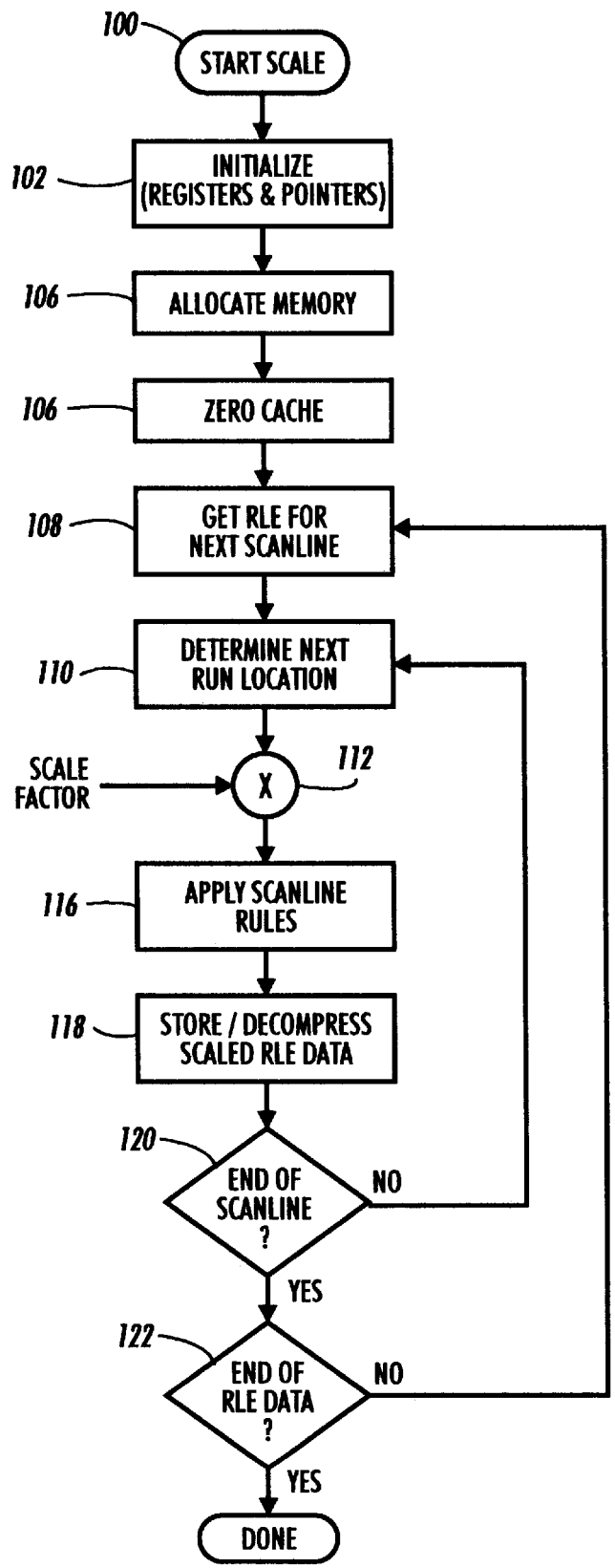
FIG. 5 is a detailed flow chart illustrating the various steps that are executed for accomplishing the present invention in the hardware embodiment depicted in FIG. 3.
Figure 6:
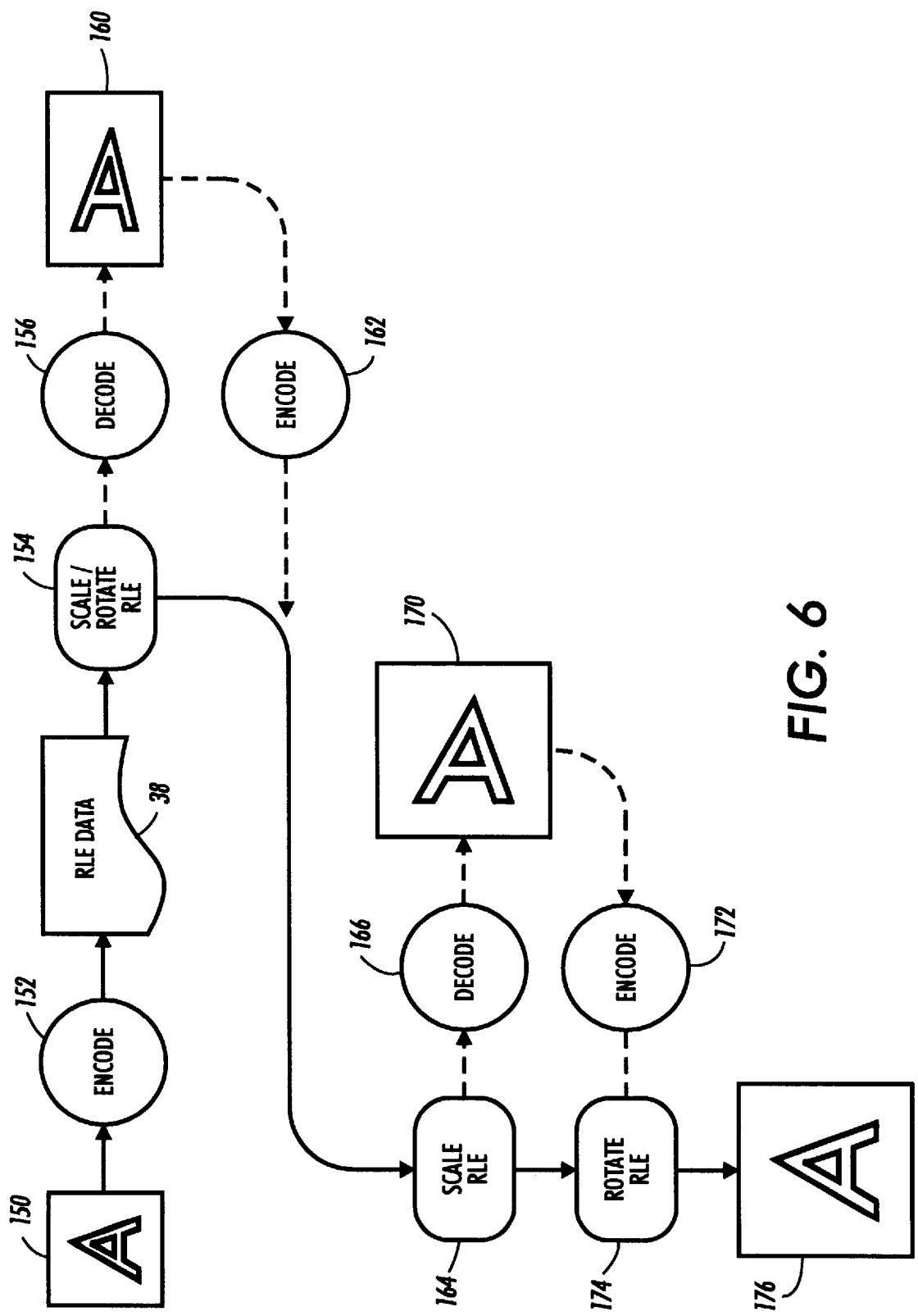
FIG. 6 is an exemplary illustration of the data flow in accordance with a further aspect of the present invention where at least two image processing operations are performed on run length encoded data.

Having described the operation of a hardware embodiment of the present invention, attention is now turned to FIGS. 5 and 6 which will be used in conjunction with reference to the Software Appendix to describe the operation of the preferred embodiment in detail. Initially, the operation starts at step 100, by a call to the shrink( ) code module found in the Appendix. The module would first initialize all variables employed therein, including a series of pointers to manage the memory access operations, step 102. Once initialized, scaled RLE data memory allocation is accomplished at step 106. At step 108, a portion of the RLE data is retrieved, preferably sufficient RLE data can be buffered so as to contain data for a complete scanline.

Once the RLE data is available for a scanline, it is parsed or otherwise interrogated to identify the lengths of black and white runs along the scanline as indicated by step 110. At step 110, the length of the next run in the scanline is parsed, and the resultant value is multiplied by the scale factor at step 112 to produce a product. The product is then passed to step 116 where scaling rules are applied. In particular, the scaling rules are employed to test and treat any of the following:

a) prevent black runs from being reduced below a minimum to preserve text or line art (see Appendix page 26, lines 18–22 and page 27, lines 13–17); and b) adjust the running average blackness of a line to preserve halftone density.

Once the rules of step 116 have been applied, the scaled RLE data is ready for output to a scaled RLE data memory as previously allocated. As will be appreciated, the multiplication and rules operations described with respect to steps 112 and 116 may be accomplished using a look-up table (LUT), where the index to the table may be the run length data and the output is the scaled RLE data processed in accordance with the rules. Such a LUT may be preprogrammed in accordance with the selected scale factor and may be preferable to accomplish the scaling process of the present invention in a computationally efficient manner.

In order to accomplish the scaling operation in two-dimensions, the writing operation of step 118 may be controlled as a function of the scaling factor. For example, if a scaling factor of 2x is employed, each scanline of scaled RLE data will be decoded and written to memory twice. Conversely, for a scale factor of 0.5x, every other scanline of RLE data can be ignored or discarded and will not be written to the scaled RLE data memory. For other scaling factors, a nearest neighbor selection process can be applied to determine which set of scanline data to write. Other well-known interpolation procedures can be applied to further process the binary image data once it has been decoded.

When a scanline of RLE data is completed as determined at step 120, the process returns to step 110 where it is repeated for the next scanline of RLE input data. Completion of all scanlines of RLE data is monitored at step 122. Once the RLE data scaling and writing to memory has been completed, as determined at step 122, the scaling operation is done (126) and the decoding of the scaled run length data may proceed in any of the well-known decoding methods.

Turning next to FIG. 6, where there is depicted the data flow of a preferred embodiment. In such an embodiment, the present invention may be employed in conjunction with the image rotation process or apparatus of the co-pending application, Ser. No. 08/624,044, previously incorporated by reference to produce a rotated and two-dimensionally scaled image. It is possible, as will be described and as may be accomplished by a combination of the processes disclosed in the Software Appendix, to combine the image rotation operations along with one-dimensional RLE data scaling as has been described herein. Such a combination avoids the need for inefficient bit-wise operations and capitalizes on the scaling rules described with respect to the prior embodiment.

In the embodiment depicted in FIG. 6, an array of image data 150, preferably a binary bitmap but not limited thereto, is first compressed at the encoding operation 152 to produce a stream of RLE data 38 as has been described previously. Subsequently, the RLE data is processed by a combination of the scaling (shrink( )) and rotating (e.g., rotate( )) operations as reflected by operation 154. Once processed, the output of operation 154 could optionally be run length decompressed as depicted by operation 156 to produce a rotated and one-dimensionally scaled image 160. This scaled and rotated image bitmap would then be re-encoded at encoding operation 162 to produce a rotated RLE data stream (not shown) that is supplied to an RLE scaling operation 164.

As will be appreciated, the operations described herein may be reduced so as to scale and rotate the RLE data itself without the interim decoding and re-encoding reflected in operations 156 and 162. Subsequently, the scaled and rotated RLE data is then scaled in a second dimension (using shrink( )) as previously described and incorporating the scaling rules so as to assure accurate rendition of the scaled image once decoded at operation 166 to produce bitmap image 170. As will be appreciated, accomplishment of the image processing operations depicted in FIG. 6 up to and including the rendition of bitmap 170 has particular and advantageous application in the environment of network and multifunctional printing. Specifically, the invention may be employed to take, for example, a 300 dpi input image as represented by reference numeral 150 and process that image to both scale it by 2× and rotate it by 90 degrees in a clockwise direction to produce image 170. The advantage of such processing is that it will allow a low resolution landscape image to be rendered at a higher resolution in a portrait fashion for printing or display by an IOT.

In yet another alternative embodiment, image 170 may be optionally re-encoded once again at operation 172 and rotated counterclockwise at operation 172, as previously described, to produce a scaled image 176 in the same orientation as the input image. Here again, the decoding (166) and re-encoding (172) operations are preferably eliminated and all processing would be performed on the run length encoded data in a preferred embodiment.

In recapitulation, the present invention is a method and apparatus for the efficient processing of binary images represented as a run length encoded data stream. The system employs a CPU and cache or other memory for efficiently scaling or scaling and rotating parsed RLE data. Subsequently, the scaled RLE data can be decoded to produce a scaled image bitmap.

It is, therefore, apparent that there has been provided, in accordance with the present invention, a method and apparatus for the efficient processing of run length encoded binary images. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

SOFTWARE APPENDIX

```
     #include <stdio.h>
     #include "improc.h"
     #include "ccitt.h"
 5   image imageMalloc();
     image imageMallocZero();

void shrink(imageIn,imageOut,num,error)
     image *imageIn;
10   image *imageOut;
     unsigned int num;
     errorType *error;
     {
         char *input;
15       char* output;
     /*      image imagePr;  joe*/
         int lines;
         int lineLength;
         unsigned int newll;
20       int lineNum;
         char *end,*start;
         OPinst *inst;
         short change[10000];

25
         input=imageIn->buffer;
         lines=imageIn->lines;
         lineLength=imageIn->lineLength;
     /*      newll=(((((int)lineLength*num)>>8)+31)/32)*32;*/
30       newll=(lineLength*num)>>16;
         *imageOut=imageMalloc(lines,newll,error);
         if (*error!=ERROR_OK) return ;
         imageOut->resolution=imageIn->resolution;
         imageOut->orientation=imageIn->orientation;
35       output=imageOut->buffer;
         start=input;
         inst=initOP(output,(((lines+31)/32)*32)*newll/8);
         for (lineNum=0;lineNum<lines;lineNum++)
         {
40           end=start+((lineLength+31)/32)*4;
             getChanges (start,end,(short *)change,lineLength);
             outputPixels((short *)change,lineLength,num,
                     (unsigned int)0,inst);
     /*          printChanges(change,lineLength);*/
45   /*      if (outPtr>imageOut->add+imageOut->buffsize)
             printf("out ptr = %lx new val = %lx \n",outPtr,inst->SoutPtr);*/
             start+=((lineLength+31)/32)*4;
         }
         imageOut->lineLength=newll;
50       destOP(inst);
     }
     /*
```

Copyright © 1995,1996. Xerox Corporation.    18

```
        printChanges(change,lineLength)
        short *change;
        int lineLength;
        {
 5          do
            {
                printf("%d ",*change);
            }
            while (*(change++)<lineLength);
10          printf("\n");
        }
        */ include <stdio.h>
15      #include "improc.h"
        #define nextColor(x) (x^1)
        #define white 0
        #define black 1
        #define TRUE 1
20      #define FALSE 0
        #define GETBYTE0(input)         \
                (inWord&0xff)

#define GETBYTE1(input)         \
25              ((inWord&0xff00)>>8)

#define GETBYTE2(input)         \
                ((inWord&0xff0000)>>16)

30      #define GETBYTE3(input)         \
                ((inWord&0xff000000)>>24)

/*#define UNIX*/
        static long btab[256]=
35      {
        #include "stb.h"
        };
        static long wtab[256]=
        {
40      #include "stw.h"
        };
        extern int line;
        void getChanges (input1,end1,change1,lineLength)
        char *input1;
45      char *end1;
        short *change1;
        unsigned int lineLength;
        {
                register char *input;
50              register char *end;
                register short *change;
                register char color;
                register unsigned char index0,index1,index2,index3;
```

Copyright © 1995,1996. Xerox Corporation.

```
                register int total;
                register int count;
                register long entry,inWord;
                int scanBytes;
 5              input=input1;
                end=end1;
                change=change1;
                scanBytes=end-input;
                color=white;
10              change[0]=0;
        lnext1:
                        if(color==white)
                        {
        lwhite1:
15                              while((inWord=*(unsigned long *)input)==0)
                                {
                                        *change +=32;
                                        input +=4;
                                        if (input>=end)
20                                              goto lout;
                                }
                                input+=4;
                                index3=GETBYTE3(input);
                                total=0;
25                              if(!index3)
                                {
                                        *change +=8;
                                        goto lwhite2;
                                }
30                              else if (index3==0xaa)
                                {
                                        entry=0x11111111;
                                        count=0;
                        /*color=nextColor(color);*/
35                                      goto loop21;
                                }
                                entry=*(wtab+index3);
                        }
                        else
40                      {
                                inWord=*(unsigned long *)input;
                                input+=4;
                                index3=GETBYTE3(input);
            /*                  if(index!=index1) printf("NE at 0b %x %x\n",index,index1);*/
45                              total=0;
                                if (index3==0x55)
                                {
                                        entry=0x11111111;
                                        count=0;
50                                      /**(change+1)=*change;
                                        change++;

color=nextColor(color);*/
                                        goto loop21;
```

Copyright © 1995,1996, Xerox Corporation.        20

```
                              }
                              entry=*(btab+index3);
                  }
loop1:
                              count=entry&0xf;
                              entry >>=4;
loop21:           *change=*change+count;
                              total +=count;
                              if (total==8) goto lbreak1;
                              *(change+1)=*change;
                              change++;
                              color=nextColor(color);
                              goto loop1;
lbreak1:

/*lnext2:*/  /*joe*/
                  if(color==white)
                              {
lwhite2:
                              index2=GETBYTE2(input);

total=0;
                              if(!index2)
                              {
                                    *change +=8;
                                    goto lwhite3;
                              }
                              else if (index2==0xaa)
                              {
                                    entry=0x11111111;
                                    count=0;
      /*color=nextColor(color);*/
                                    goto loop22;
                              }
                              entry=*(wtab+index2);
                  }
                  else
                  {
                              index2=GETBYTE2(input);

total=0;
                              if (index2==0x55)
                              {
                                    entry=0x11111111;
                                    count=0;
                                    /**(change+1)=*change;
                                    change++;
                  color=nextColor(color);*/
                                    goto loop22;
                              }
                              entry=*(btab+index2);
```

Copyright © 1995,1996. Xerox Corporation.    21

```
                        }
        loop2:
                                count=entry&0xf;
                                entry >>=4;
        loop22: *change=*change+count;
                                total +=count;
                                if (total==8) goto lbreak2;
                                *(change+1)=*change;
                                change++;
                                color=nextColor(color);
                                goto loop2;
        lbreak2;

/*lnext3:*/      /*joe*/
                        if(color==white)
                        {
        lwhite3:
        #ifdef UNIX
                                if(((int)input)%4==0)
        #endif
                                index1=GETBYTE1(input);

total=0;
                                if(!index1)
                                {
                                        *change +=8;
                                        goto lwhite4;
                                }
                                else if (index1==0xaa)
                                {
                                        entry=0x11111111;
                                        count=0;
        /*color=nextColor(color);*/
                                        goto loop23;
                                }
                                entry=*(wtab+index1);
                        }
                        else
                        {
                                index1=GETBYTE1(input);

total=0;
                                if (index1==0x55)
                                {
                                        entry=0x11111111;
                                        count=0;
                                        /**(change+1)=*change;
                                        change++;

color=nextColor(color);*/
```

Copyright © 1995,1996, Xerox Corporation.    22

```
                                    goto loop23;
                            }
                            entry=*(btab+index1);
                    }
loop3:
                            count=entry&0xf;
                            entry >>=4;
loop23:     *change=*change+count;
                            total +=count;
                            if (total==8) goto lbreak3;
                            *(change+1)=*change;
                            change++;
                            color=nextColor(color);
                            goto loop3;
lbreak3:

/*lnext4:*/     /*joe*/
                if(color==white)
                {
lwhite4:
#ifdef UNIX
                            if(((int)input)%4==0)
#endif
                            index0=GETBYTE0(input);

total=0;
                            if(!index0)
                            {
                                    *change +=8;
                                    goto lwhite1;
                            }
                            else if (index0==0xaa)
                            {
                                    entry=0x11111111;
                                    count=0;
/*color=nextColor(color);*/
                                    goto loop24;
                            }
                            entry=*(wtab+index0);
                }
                else
                {
                            index0=GETBYTE0(input);

total=0;
                            if (index0==0x55)
                            {
                                    entry=0x11111111;
```

Copyright © 1995,1996. Xerox Corporation.        23

```
                                count=0;
                /*color=nextColor(color);
                                *(change+1)=*change;
                                change++;*/
                                goto loop24;
                }
                                entry=*(btab+index0);
                }
loop4:
                                count=entry&0xf;
                                entry >>=4;
loop24: *change=*change+count;
                                total +=count;
                                if (total==8) goto lbreak4;
                                *(change+1)=*change;
                                change++;
                                color=nextColor(color);
                                goto loop4;
lbreak4:
                if (input>=end) goto lout;
                goto lnext1;

lout:
        while (*change>lineLength) change--;
        change++;
        *change=lineLength;
/*      printf("last-1 = %d last = %d lineLength = %d\n",
                        *(change-1),*change,lineLength);*/
        change++;
        *change=lineLength;
        change++;
        *change=lineLength;
        change++;
} void initRun()       /*joe*/
{
} void printLine(input,end)  /*joe*/
unsigned char *input,*end;
{
/*      printf("input=%lx end=%lx\n",input,end);
        while (input<=end)
        {
                printf("%x\n",*input);
                input++;
        }*/
```

Copyright © 1995,1996. Xerox Corporation.        24

```
        } getChangesInImage(imageIn,lineNumber,changePtr)
        image imageIn;
5       int lineNumber;
        short *changePtr;
        {
                char *start,*end;
                unsigned int lineLength,bytesInLine,allignedBytesInLine;
10              lineLength=imageIn.lineLength;
                bytesInLine=((lineLength/8)*8)/8;
                allignedBytesInLine=rnd32(lineLength)/8;
                start=imageIn.buffer+lineNumber*allignedBytesInLine;
                end=start+bytesInLine;
15              getChanges (start,end,changePtr,lineLength);

} include <stdio.h>
20      #include "improc.h"
        #include "ccitt.h"
        #include <string.h>    /*joe/6*/
        #define VIDEO
        #define UNIX
25      #define denom 16
        #ifdef UNIX
        #define store(_a)                                       \
                *((long *)outPtr)=output;                        \
                outPtr+=4;
30      #else
        #define store(_a)                                       \
                *(outPtr++)=_a>>24;                              \
                *(outPtr++)=(_a & 0x00ff0000)>>16;               \
                *(outPtr++)=(_a & 0x0000ff00)>>8;                \
35              *(outPtr++)=(_a & 0x000000ff);
        #endif int outputPixels(ptr,lineLength,num,shift,inst)
        short *ptr;
40      short lineLength;
        unsigned int num;
        unsigned int shift;
        OPinst *inst;
        {
45          unsigned int n/*,rnd*/,newPos;          /*joe/6*/
            unsigned int bitsInUse;
            unsigned int longs;
            unsigned int temp;
        /*  unsigned int temp2;*/    /*joe/6*/
50          char *outPtr;
            register unsigned int number,Onumber;
            short current_p,Ocurrent_p;
            register int bitsFree;
            long output;
```

Copyright © 1995,1996. Xerox Corporation.     25

```
        int newll;
        outPtr=inst->SoutPtr;
        bitsFree=inst->SbitsFree;
        output=inst->Soutput;
5       current_p=0;
        Ocurrent_p=0;
        outPtr+=(shift/32)*4;
        bitsFree=32-(shift%32);
    lwhite:
10          if (Ocurrent_p==lineLength) goto lout;
            Onumber=*ptr-Ocurrent_p;
            if (Onumber==0)
            {
                ptr++;
15              goto lblack;
            }
            newPos=(*ptr*num)>>denom;
            if (newPos<(unsigned int)(current_p))      /*joe/6*/
            {
20              ptr++;
                goto lblack;
            } number=newPos-current_p;
25          Ocurrent_p=*ptr;
            current_p=newPos;
            ptr++;
                if(bitsFree>(int)(number))      /*joe/6*/
                {
30                  bitsFree-=number;
                        goto lblack;
                }
                if(bitsFree==(int)(number))     /*joe/6*/
                {
35                  store(output);
                    bitsFree=32;
                    output=0;
                    goto lblack;
                }
40
                store(output);
                number-=bitsFree;
                longs=number>>5;
                memset(outPtr,0,longs<<2);
45              outPtr+=longs<<2;
                output=0;
                bitsFree=32-(number-(longs<<5));

lblack:
50          Onumber=*ptr-Ocurrent_p;
            Ocurrent_p=*ptr;
            newPos=((*ptr)*num)>>denom;
            if (Onumber==0)
            {
```

```
            ptr++;
            goto lwhite;
        }
        number=newPos-current_p;
 5      if (current_p>(int)(newPos))      /*joe/6*/
        {
            ptr++;
            goto lwhite;
        }
10      current_p +=number;
        ptr++;

if(number==0)
        {
15          number=1;
            current_p++;
        }
        if(bitsFree>=(int)(number))       /*joe/6*/
        {
20          bitsInUse=32-bitsFree;
            temp=0xffffffff;
            temp=(temp<<bitsInUse)>>(32-number);
            temp=temp<<(bitsFree-number);
            output+=temp;
25          bitsFree-=number;
            if (bitsFree==0)
            {
                store(output);
                output=0;
30              bitsFree=32;
            }
            goto lwhite;
        }
        number-=bitsFree;
35      temp=0xffffffff;
        temp=temp>>(32-bitsFree);
        output+=temp;
        store(output);
        longs=number>>5;
40      for(n=0;n<longs;n++)
        {
            *((long *)outPtr)=0xffffffff;
            outPtr+=4;
        }
45      number=number-(longs<<5);
        bitsFree=32-number;
        if(bitsFree==32)
        {
            output=0;
50          goto lwhite;
        }
        output=0xffffffff;
        output=output<<bitsFree;
        goto lwhite;
```

Copyright © 1995,1996. Xerox Corporation.    27

```
lout:
        if (bitsFree!=32)
        {
            store(output);
        }
        inst->SbitsFree=32;

inst->Soutput=0;

newll=(((((int)lineLength*num)>>denom)+31)/32)*32;
        inst->SoutPtr +=(newll+shift)/8;
        return newll;
}

OPinst *initOP(outBuff,bytesInImage)
char *outBuff;
long bytesInImage;
{
        long longsInImage;
        register long *imageEnd;
/*      register long *Ptr;*/   /*joe/6*/
        OPinst *inst;
        inst=(OPinst *)malloc(sizeof(OPinst));
        inst->Soutput=0;
        inst->SbitsFree=32;
        longsInImage=(bytesInImage)/4;
        imageEnd =(long *)(outBuff+longsInImage*4);
        memset((long *)outBuff,0,longsInImage*4);
/*      for (Ptr=(long*)outBuff;Ptr<imageEnd;Ptr++)
        {
            *Ptr=0;
        }*/
        inst->SoutPtr=outBuff;
        return inst;
} int destOP(inst)          /*joe/6*/
OPinst *inst;
{
        free(inst);
            return -1;    /*joe/6*/
} include <stdio.h>
include "improc.h"
#define fMask1bit 0xaaaaaaaa
#define sMask1bit 0x55555555
#define fMask2bit 0xcccccccc
#define sMask2bit 0x33333333
#define fMask4bit 0xf0f0f0f0
#define sMask4bit 0x0f0f0f0f
#define SWAPWORD(wrd)
image imageMalloc();
```

Copyright © 1995,1996. Xerox Corporation.    28

```
        image imageMallocZero();
        void render();

5      rotate1(imageIn,imageOut,error)
        image *imageIn;
        image * imageOut;
        errorType *error;
        {
10          FILE * fdlocs;
            unsigned char *ipAdd;
            unsigned char *opAdd;
            unsigned char *inputBuff,*outputBuff,*ptr;
            int ipScanLines;
15          unsigned int ipRow,ipColumn,opRow,opColumn,ipRows,ipColumns;
            unsigned int opScanBytes;
            unsigned int ipScanBytes,startLines;
        /*      if(imageIn->bitsPerPixel!=1)
                {
20                  rotateAntiClockGrey(imageIn,imageOut,error);
                    return;
                }*/
            ipScanBytes=rnd32(imageIn->lineLength)/8;
            ipScanLines=((imageIn->lines+31)/32)*32;
25          inputBuff=(unsigned char *)(imageIn->buffer);

for(ptr=inputBuff+(imageIn->lines)*ipScanBytes;ptr<inputBuff+
                    ipScanBytes*ipScanLines;ptr++)
                    *ptr=0;
30          opScanBytes=ipScanLines/8;
            ipRows=(ipScanLines+31)/32;
            ipColumns=(ipScanBytes+3)/4;
            *imageOut=imageMalloc(imageIn->lineLength,ipScanLines,error);
            if (*error!=ERROR_OK) return;
35          outputBuff=(unsigned char *)(imageOut->buffer);
            imageClear(imageOut);
            imageOut->resolution=imageIn->resolution;
            imageOut->orientation=imageIn->orientation;
            for(ipRow=0;ipRow<ipRows;ipRow++)
40          {
                for(ipColumn=0;ipColumn<ipColumns;ipColumn++)
                {
                    ipAdd=inputBuff+ipScanBytes*32*ipRow+4*ipColumn;
                    opRow=ipColumns-ipColumn-1;
45                  opColumn=ipRow;
                    opAdd=outputBuff+opScanBytes*32*opRow+4*opColumn;
                    rotateBlock(ipAdd,(unsigned long *)opAdd,ipScanBytes,
                            opScanBytes);
                }
50          }
            startLines=ipScanBytes*8-imageIn->lineLength;
            imageOut->buffer +=startLines*opScanBytes;
            imageOut->lines=imageIn->lineLength;
            imageOut->lineLength=imageIn->lines;
```

```
        }
        static rotateBlock(ipStartAdd,opStartAdd,ipScanBytes,opScanBytes)
        unsigned char *ipStartAdd;
        unsigned long *opStartAdd;
 5      unsigned int ipScanBytes;
        unsigned int opScanBytes;
        {
                unsigned long r0,r1,r2,r3,r4,r5,r6,r7;
                register unsigned long temp1,temp2;
10              unsigned char *ipPtr;
                unsigned long *opPtr,d,e,f,g;
                int l;

opPtr=opStartAdd+31*(opScanBytes>>2);
15      #ifdef UNIX
                for(l=0;l<=3;l++)
        #else
                for(l=3;l>=0;l--)
        #endif
20              {
                        ipPtr=ipStartAdd+l;

r0 <<= 8;
                        r0 +=*ipPtr;
25                      ipPtr +=ipScanBytes;

r1 <<= 8;
                        r1 +=*ipPtr;
                        ipPtr +=ipScanBytes;
30
                        r2 <<= 8;
                        r2 +=*ipPtr;
                        ipPtr +=ipScanBytes;

35                      r3 <<= 8;
                        r3 +=*ipPtr;
                        ipPtr +=ipScanBytes;

r4 <<= 8;
40                      r4 +=*ipPtr;
                        ipPtr +=ipScanBytes;

r5 <<= 8;
                        r5 +=*ipPtr;
45                      ipPtr +=ipScanBytes;

r6 <<= 8;
                        r6 +=*ipPtr;
                        ipPtr +=ipScanBytes;
50
                        r7 <<= 8;
                        r7 +=*ipPtr;
                        ipPtr +=ipScanBytes;
```

Copyright © 1995,1996. Xerox Corporation.     30

```
r0 <<= 8;
r0 +=*ipPtr;
ipPtr +=ipScanBytes;

r1 <<= 8;
r1 +=*ipPtr;
ipPtr +=ipScanBytes;

r2 <<= 8;
r2 +=*ipPtr;
ipPtr +=ipScanBytes;

r3 <<= 8;
r3 +=*ipPtr;
ipPtr +=ipScanBytes;

r4 <<= 8;
r4 +=*ipPtr;
ipPtr +=ipScanBytes;

r5 <<= 8;
r5 +=*ipPtr;
ipPtr +=ipScanBytes;

r6 <<= 8;
r6 +=*ipPtr;
ipPtr +=ipScanBytes;

r7 <<= 8;
r7 +=*ipPtr;
ipPtr +=ipScanBytes;

r0 <<= 8;
r0 +=*ipPtr;
ipPtr +=ipScanBytes;

r1 <<= 8;
r1 +=*ipPtr;
ipPtr +=ipScanBytes;

r2 <<= 8;
r2 +=*ipPtr;
ipPtr +=ipScanBytes;

r3 <<= 8;
r3 +=*ipPtr;
ipPtr +=ipScanBytes;

r4 <<= 8;
r4 +=*ipPtr;
ipPtr +=ipScanBytes;

r5 <<= 8;
r5 +=*ipPtr;
```

Copyright © 1995,1996. Xerox Corporation.    31

```
           ipPtr +=ipScanBytes;

r6 <<= 8;
           r6 +=*ipPtr;
           ipPtr +=ipScanBytes;

r7 <<= 8;
           r7 +=*ipPtr;
           ipPtr +=ipScanBytes;

r0 <<= 8;
           r0 +=*ipPtr;
           ipPtr +=ipScanBytes;

r1 <<= 8;
           r1 +=*ipPtr;
           ipPtr +=ipScanBytes;

r2 <<= 8;
           r2 +=*ipPtr;
           ipPtr +=ipScanBytes;

r3 <<= 8;
           r3 +=*ipPtr;
           ipPtr +=ipScanBytes;

r4 <<= 8;
           r4 +=*ipPtr;
           ipPtr +=ipScanBytes;

r5 <<= 8;
           r5 +=*ipPtr;
           ipPtr +=ipScanBytes;

r6 <<= 8;
           r6 +=*ipPtr;
           ipPtr +=ipScanBytes;

r7 <<= 8;
           r7 +=*ipPtr;
           ipPtr +=ipScanBytes;

if((r0|r1|r2|r3|r4|r5|r6|r7)==0) goto store;

temp1=r0 & fMask1bit;
           temp2=r1 & sMask1bit;
           r0 = r0 & sMask1bit;
           r1 = r1 & fMask1bit;
           r0 = r0 << 1;
           r1 = r1 >> 1;
           r0 = r0 | temp2;
           r1 = r1 | temp1;

temp1=r2 & fMask1bit;
```

Copyright © 1995,1996. Xerox Corporation.        32

```
temp2=r3 & sMask1bit;
r2 = r2 & sMask1bit;
r3 = r3 & fMask1bit;
r2 = r2 << 1;
r3 = r3 >> 1;
r2 = r2 | temp2;
r3 = r3 | temp1;

temp1=r4 & fMask1bit;
temp2=r5 & sMask1bit;
r4 = r4 & sMask1bit;
r5 = r5 & fMask1bit;
r4 = r4 << 1;
r5 = r5 >> 1;
r4 = r4 | temp2;
r5 = r5 | temp1;

temp1=r6 & fMask1bit;
temp2=r7 & sMask1bit;
r6 = r6 & sMask1bit;
r7 = r7 & fMask1bit;
r6 = r6 << 1;
r7 = r7 >> 1;
r6 = r6 | temp2;
r7 = r7 | temp1;

temp1 = r0 & fMask2bit;
        temp2 = r2 & sMask2bit;
        r0 = r0 & sMask2bit;
        r2 = r2 & fMask2bit;
        r0 = r0 << 2;
        r2 = r2 >> 2;
        r0 = r0 | temp2;
        r2 = r2 | temp1;

temp1 = r1 & fMask2bit;
        temp2 = r3 & sMask2bit;
        r1 = r1 & sMask2bit;
        r3 = r3 & fMask2bit;
        r1 = r1 << 2;
        r3 = r3 >> 2;
        r1 = r1 | temp2;
        r3 = r3 | temp1;

temp1 = r4 & fMask2bit;
        temp2 = r6 & sMask2bit;
        r4 = r4 & sMask2bit;
        r6 = r6 & fMask2bit;
        r4 = r4 << 2;
        r6 = r6 >> 2;
        r4 = r4 | temp2;
        r6 = r6 | temp1;

temp1 = r5 & fMask2bit;
```

Copyright © 1995,1996. Xerox Corporation.    33

```
          temp2 = r7 & sMask2bit;
          r5 = r5 & sMask2bit;
          r7 = r7 & fMask2bit;
          r5 = r5 << 2;
          r7 = r7 >> 2;
          r5 = r5 | temp2;
          r7= r7 | temp1;

temp1 = r0 & fMask4bit;
          temp2 = r4 & sMask4bit;
          r0 = r0 & sMask4bit;
          r4 = r4 & fMask4bit;
          r0 = r0 << 4;
          r4 = r4 >> 4;
          r0 = r0 | temp2;
          r4= r4 | temp1;

temp1 = r1 & fMask4bit;
          temp2 = r5 & sMask4bit;
          r1 = r1 & sMask4bit;
          r5 = r5 & fMask4bit;
          r1 = r1 << 4;
          r5 = r5 >> 4;
          r1 = r1 | temp2;
          r5= r5 | temp1;

temp1 = r2 & fMask4bit;
          temp2 = r6 & sMask4bit;
          r2 = r2 & sMask4bit;
          r6 = r6 & fMask4bit;
          r2 = r2 << 4;
          r6 = r6 >> 4;
          r2 = r2 | temp2;
          r6= r6 | temp1;

temp1 = r3 & fMask4bit;
          temp2 = r7 & sMask4bit;
          r3 = r3 & sMask4bit;
          r7 = r7 & fMask4bit;
          r3 = r3 << 4;
          r7 = r7 >> 4;
          r3 = r3 | temp2;
          r7= r7 | temp1;
store:
          SWAPWORD(r7);
          *opPtr=r7;
          opPtr -=(opScanBytes>>2);

SWAPWORD(r6);
          *opPtr=r6;
          opPtr -=(opScanBytes>>2);

SWAPWORD(r5);
          *opPtr=r5;
```

Copyright © 1995,1996. Xerox Corporation.        34

```
                opPtr -=(opScanBytes>>2);

SWAPWORD(r4);
                *opPtr=r4;
 5              opPtr -=(opScanBytes>>2);

SWAPWORD(r3);
                *opPtr=r3;
                opPtr -=(opScanBytes>>2);
10
                SWAPWORD(r2);
                *opPtr=r2;
                opPtr -=(opScanBytes>>2);

15              SWAPWORD(r1);
                *opPtr=r1;
                opPtr -=(opScanBytes>>2);

SWAPWORD(r0);
20              *opPtr=r0;
                opPtr -=(opScanBytes>>2);
            }
        }

25
        void rotate(imageIn,imageOut,error)
        image *imageIn;
        image *imageOut;
        errorType *error;
30      {
            unsigned long *ipBuffer,*opBuffer,*lineStart,*lineEnd,*opStart,
                tempopBuffer[100000],*tempPtr;
            unsigned short change[6600],*changePtr;
            unsigned int ipLines,ipLineLength,opLines,opLineLength,
35              ipLineNo,opLineNo,ipLineBase;
            unsigned int longsInIpLine,longsInOpLine,bitPos;
            /*int bitPosLast;*/
            char bitNo;
            unsigned long outWord,*wordOffset,*offset,temp;
40          unsigned long *ptr;
            if(imageIn->bitsPerPixel!=1)
            {
                rotateAntiClockGrey(imageIn,imageOut,error);
                return;
45          }
            ipLines=rnd32(imageIn->lines);
            ipLineLength=rnd32(imageIn->lineLength);
            opLines=ipLineLength;
            opLineLength=ipLines;
50
            *imageOut=imageMallocZero(opLines,opLineLength,error);
            imageOut->resolution=imageIn->resolution;
            imageOut->orientation=imageIn->orientation;
```

Copyright © 1995,1996. Xerox Corporation.   35

```
       if(*error!=ERROR_OK)
       {
         return;
       }
 5     ipBuffer=imageIn->buffer;
       opBuffer=imageOut->buffer;
       for(ptr=ipBuffer+(imageIn->lines)*ipLineLength/32;ptr<ipBuffer+
              ipLineLength/32*ipLines;ptr++)
          *ptr=0;
10     longsInIpLine=rnd32(ipLineLength)/32;
       longsInOpLine=rnd32(opLineLength)/32;
       for(opLineNo=0;opLineNo<=opLines;opLineNo++)
       {
          tempopBuffer[opLineNo]=0;
15     }
       for(ipLineBase=0;ipLineBase<ipLines;ipLineBase+=32)
       {
          outWord=((unsigned long)0x80000000);
          for(ipLineNo=ipLineBase;ipLineNo<ipLineBase+32;ipLineNo++)
20        {
              lineStart=ipBuffer+ipLineNo*longsInIpLine;
              lineEnd=lineStart+longsInIpLine;
              getChanges(lineStart,lineEnd,change,ipLineLength);
              changePtr=change;
25                /*bitPosLast=-1;*/
              while((bitPos=*changePtr)<ipLineLength)
              {
                  wordOffset=tempopBuffer+(ipLineLength-bitPos-1);
                  *wordOffset=*wordOffset|outWord;
30                changePtr++;

}
              outWord=outWord>>1;
          }
35        offset=opBuffer+ipLineBase/32+longsInOpLine*(opLines-1);
          temp=0;
          tempPtr=tempopBuffer+opLines-1;
          for(opLineNo=0;opLineNo<opLines;opLineNo++)
          {
40            temp=temp^*tempPtr;
              *offset=temp;
              offset-=longsInOpLine;
              *tempPtr=0;
              tempPtr--;
45        }
       }
       imageOut->lines=imageIn->lineLength;
       imageOut->lineLength=imageIn->lines;
       imageOut->buffer+=(opLines-imageOut->lines)*longsInOpLine*4;
50     }
```

Copyright © 1995,1996. Xerox Corporation.   36

```
        #include <stdio.h>
        #include "improc.h"
        #define fMask1bit 0xaaaaaaaa
        #define sMask1bit 0x55555555
  5     #define fMask2bit 0xcccccccc
        #define sMask2bit 0x33333333
        #define fMask4bit 0xf0f0f0f0
        #define sMask4bit 0x0f0f0f0f
        #define SWAPWORD
 10     image imageMalloc();
        image imageMallocZero();
        void render();
        #define setBit(buffer,lineLongs,bitNo,offset,line)         \
            {                                                     \
 15             unsigned long outWord,*wordOffset;                \
                outWord=((unsigned long)0x80000000)>>bitNo;       \
                wordOffset=buffer+(line)*lineLongs+offset;        \
                *wordOffset=*wordOffset|outWord;                  \
            }
 20
        rotatecw1(imageIn,imageOut,error)
        image *imageIn;
        image *imageOut;
        errorType *error;
 25     {
            unsigned char *ipAdd;
            unsigned char *opAdd;
            char *inputBuff,*outputBuff,*ptr;
            int ipScanLines;
 30         unsigned int ipRow,ipColumn,opRow,opColumn,ipRows,ipColumns;
            unsigned int opScanBytes;
            unsigned int ipScanBytes;
            if(imageIn->bitsPerPixel!=1)
            {
 35             rotateClockGrey(imageIn,imageOut,error);
                return;
            } ipScanBytes=rnd32(imageIn->lineLength)/8;
            ipScanLines=((imageIn->lines+31)/32)*32;
            inputBuff=(char *)(imageIn->buffer
 40                           -ipScanBytes*(ipScanLines-imageIn->lines));

for(ptr=inputBuff;ptr<imageIn->buffer;ptr++)
                *ptr=0;

45     /*  for(ptr=inputBuff+(imageIn->lines)*ipScanBytes;ptr<inputBuff+
                ipScanBytes*ipScanLines;ptr++)
                *ptr=0;   */
            opScanBytes=ipScanLines/8;
            ipRows=(ipScanLines+31)/32;
 50         ipColumns=(ipScanBytes+3)/4;
            *imageOut=imageMalloc(imageIn->lineLength,ipScanLines,error);
            if (*error!=ERROR_OK) return;
            outputBuff=(char *)(imageOut->buffer);
            imageOut->resolution=imageIn->resolution;
```

```
            imageOut->orientation=imageIn->orientation;
            imageClear(imageOut);
            for(ipRow=0;ipRow<ipRows;ipRow++)
            {
                for(ipColumn=0;ipColumn<ipColumns;ipColumn++)
                {
                    ipAdd=inputBuff+ipScanBytes*32*ipRow+4*ipColumn;
                    opRow=ipColumn;
                    opColumn=ipRows-ipRow-1;
                    opAdd=outputBuff+opScanBytes*32*opRow+4*opColumn;
                    rotateBlock(ipAdd,(unsigned long *)opAdd,
                        opScanBytes,ipScanBytes);
                }
            }
            imageOut->lines=imageIn->lineLength;
            imageOut->lineLength=imageIn->lines;
        } static rotateBlock(ipStartAdd,opStartAdd,opScanBytes,ipScanBytes)
        unsigned char *ipStartAdd;
        unsigned long *opStartAdd;
        unsigned int opScanBytes;
        unsigned int ipScanBytes;

{
            unsigned long r[8],temp1,temp2;
            unsigned char *ipPtr;
            unsigned long *opPtr,d,e,f,g;
            int n,m,l,p;

/*  opPtr=opStartAdd+32*(opScanBytes>>2);*/
            opPtr=opStartAdd;
        #ifdef UNIX
            for(l=0;l<=3;l++)
        #else
            for(l=3;l>=0;l--)
        #endif
            {
                ipPtr=ipStartAdd+l+31*ipScanBytes;
                for(m=0;m<=3;m++)
                {
                    for(n=7;n>=0;n--)
                    {
                        r[n] <<= 8;
                        r[n] +=*ipPtr;
                        ipPtr -=ipScanBytes;
                    }
                }
                for (n=0;n<=6;n +=2)
                {
                    temp1=r[n] & sMask1bit;
                    temp2=r[n+1] & fMask1bit;
                    r[n] = r[n] & fMask1bit;
                    r[n+1] = r[n+1] & sMask1bit;
```

Copyright © 1995,1996. Xerox Corporation.     38

```
                    r[n] = r[n] >> 1;
                    r[n+1] = r[n+1] << 1;
                    r[n] = r[n] | temp2;
                    r[n+1] = r[n+1] | temp1;
            }
            for (m=0;m<=4;m +=4)
            {
                for (n=0;n<=1;n++)
                {
                    temp1 = r[m+n] & sMask2bit;
                    temp2 = r[m+n+2] & fMask2bit;
                    r[m+n] = r[m+n] & fMask2bit;
                    r[m+n+2] = r[m+n+2] & sMask2bit;
                    r[m+n] = r[m+n] >> 2;
                    r[m+n+2] = r[m+n+2] << 2;
                    r[m+n] = r[m+n] | temp2;
                    r[m+n+2]= r[m+n+2] | temp1;
                }
            }
            for (n=0;n<=3;n++)
            {
                temp1 = r[n] & sMask4bit;
                temp2 = r[n+4] & fMask4bit;
                r[n] = r[n] & fMask4bit;
                r[n+4] = r[n+4] & sMask4bit;
                r[n] = r[n] >> 4;
                r[n+4] = r[n+4] << 4;
                r[n] = r[n] | temp2;
                r[n+4]= r[n+4] | temp1;
            }
            for (n=0;n<=7;n++)
            {
                SWAPWORD(r[n]);
                *opPtr=r[n];
                opPtr +=(opScanBytes>>2);
            }
        }
    }
} void rotatecw(imageIn,imageOut,error)
image *imageIn;
image *imageOut;
errorType *error;
{
    unsigned long *ipBuffer,*opBuffer,*lineStart,*lineEnd,*opStart,
        tempopBuffer[100000],*tempPtr,*ptr;
    unsigned short change[6600],*changePtr;
```

Copyright © 1995,1996. Xerox Corporation.    39

```
        unsigned int ipLines,ipLineLength,opLines,opLineLength,
            ipLineNo,opLineNo,ipLineBase;
        unsigned int longsInIpLine,longsInOpLine,bitPos;
        char bitNo;
5       unsigned long outWord,*wordOffset,*offset,temp;

if(imageIn->bitsPerPixel!=1)
        {
            rotateClockGrey(imageIn,imageOut,error);
10          return;
        }
        ipLines=imageIn->lines;
        ipLineLength=rnd32(imageIn->lineLength);
        opLines=ipLineLength;
15      opLineLength=ipLines;
        ipLines=rnd32(ipLines);
        *imageOut=imageMalloc(opLines,opLineLength,error);
        imageOut->resolution=imageIn->resolution;
        imageOut->orientation=imageIn->orientation;
20      if(*error!=ERROR_OK)
        {
            return;
        }
        ipBuffer=imageIn->buffer;
25      ipBuffer=(unsigned long *)(imageIn->buffer
                -((rnd32(ipLineLength))/8)*(ipLines-imageIn->lines));
        for(ptr=ipBuffer;ptr<imageIn->buffer;ptr++)
                *ptr=0;
        opBuffer=imageOut->buffer;
30
        longsInIpLine=rnd32(ipLineLength)/32;
        longsInOpLine=rnd32(opLineLength)/32;
        for(opLineNo=0;opLineNo<opLines;opLineNo++)
        {
35          tempopBuffer[opLineNo]=0;
        }
        for(ipLineBase=0;ipLineBase<ipLines;ipLineBase+=32)
        {
            outWord=((unsigned long)0x1);
40          for(ipLineNo=ipLineBase;ipLineNo<ipLineBase+32;ipLineNo++)
            {
                lineStart=ipBuffer+ipLineNo*longsInIpLine;
                lineEnd=lineStart+longsInIpLine;
                getChanges(lineStart,lineEnd,change,ipLineLength);
45              changePtr=change;
                while((bitPos=*changePtr)<ipLineLength)
                {
                    wordOffset=tempopBuffer+bitPos;
                    *wordOffset=*wordOffset|outWord;
50                  changePtr++;
                }
                outWord=outWord<<1;
            }
            offset=opBuffer+(ipLines-ipLineBase-32)/32;
```

```
            temp=0;
            tempPtr=tempopBuffer;
            for(opLineNo=0;opLineNo<opLines;opLineNo++)
            {
 5              temp=temp^*tempPtr;
                *offset=temp;
                offset+=longsInOpLine;
                *tempPtr=0;
                tempPtr++;
10          }
        }
        imageOut->lines=imageIn->lineLength;
    }
```

What is claimed is:

1. A method, operating on a programmable data processing system, for scaling an image represented as a run length encoded data stream to produce a scaled run length encoded data stream representing a scaled version of the image, comprising the steps of:

parsing the run length encoded data stream to determine the lengths of continuous runs of a color;

multiplying each of the lengths by a scaling factor to produce a stream of scaled run lengths;

applying at least one scaling rule to the stream of scaled run lengths to alter a run length therein by testing all scaled run lengths so as to assure that no run lengths representing a colored image region are eliminated;

outputting the scaled run lengths as a scaled run length encoded data stream; and decoding the scaled run length encoded data stream to produce a binary array of image signals, said binary array of image signals representing the image at a second resolution.

2. The method of claim 1, wherein said step of applying at least one scaling rule to the stream of scaled run lengths further includes testing all scaled run lengths so as to assure that all run lengths representing the colored image region are at least as large as a predetermined run length.

3. An apparatus for scaling a run length encoded data stream, comprising:

an input buffer for storing at least a portion of the run length encoded data stream;

means for parsing the run length encoded data stream to determine the lengths of continuous runs of a color;

arithmetic circuitry for multiplying each of the lengths by a scaling factor to produce a stream of scaled run lengths wherein the arithmetic circuitry includes a look-up table preprogrammed with a plurality of values so as to output a scaled product in response to an index value comprising a run length encoded data value;

memory for storing the scaled run lengths as a scaled run length encoded data stream; and means for applying at least one scaling rule to the stream of scaled run lengths to test all scaled run lengths so as to assure that no run lengths representing a colored image region within an image represented by the encoded data stream are eliminated.

4. The apparatus of claim 3, further including means for applying at least one scaling rule to the stream of scaled run lengths to test all scaled run lengths so as to assure that all run lengths representing a colored image region within an image represented by the encoded data stream are at least as large as a predetermined run length.

* * * * *